United States Patent
Watanabe

(10) Patent No.: US 11,208,552 B2
(45) Date of Patent: Dec. 28, 2021

(54) METHOD OF MANUFACTURING POLYCARBONATE RESIN PELLETS

(71) Applicant: IDEMITSU KOSAN CO., LTD., Tokyo (JP)

(72) Inventor: Nobuhiro Watanabe, Chiba (JP)

(73) Assignee: IDEMITSU KOSAN CO., LTD., Tokyo (JP)

(*) Notice: Subject to any disclaimer, the term of this patent is extended or adjusted under 35 U.S.C. 154(b) by 417 days.

(21) Appl. No.: 15/776,689

(22) PCT Filed: Nov. 8, 2016

(86) PCT No.: PCT/JP2016/083091
§ 371 (c)(1),
(2) Date: May 16, 2018

(87) PCT Pub. No.: WO2017/086209
PCT Pub. Date: May 26, 2017

(65) Prior Publication Data
US 2018/0355166 A1    Dec. 13, 2018

(30) Foreign Application Priority Data
Nov. 20, 2015 (JP) .............................. JP2015-227956

(51) Int. Cl.
*C08L 69/00* (2006.01)
*B29B 9/06* (2006.01)
(Continued)

(52) U.S. Cl.
CPC .............. *C08L 69/00* (2013.01); *B29B 7/007* (2013.01); *B29B 7/726* (2013.01); *B29B 9/06* (2013.01);
(Continued)

(58) Field of Classification Search
CPC ...................................................... C08L 69/00
See application file for complete search history.

(56) References Cited

U.S. PATENT DOCUMENTS

2015/0218369 A1    8/2015    Okamoto et al.

FOREIGN PATENT DOCUMENTS

| CN | 1444617 A | 9/2003 |
|---|---|---|
| CN | 101395666 A | 3/2009 |

(Continued)

OTHER PUBLICATIONS

International Search Report with English language translation and Written Opinion issued in International Application No. PCT/JP2016/083091 dated Jan. 10, 2017.
(Continued)

*Primary Examiner* — Larry W Thrower
(74) *Attorney, Agent, or Firm* — Foley & Lardner LLP

(57) ABSTRACT

Provided is a method of producing a polycarbonate resin pellet containing a polycarbonate resin serving as a component (A), a silicone compound serving as a component (B), and an ester of an aliphatic carboxylic acid having 12 to 22 carbon atoms and glycerin serving as a component (C), the production method including a step including introducing a blend containing the component (A), the component (B), and the component (C) into an extruder, and melt-kneading the blend in the extruder under such a condition that a temperature of a molten resin at an outlet of the extruder is 260° C. or more and 325° C. or less, followed by extrusion molding to provide a polycarbonate resin pellet, the resultant polycarbonate resin pellet containing 0.01 part by mass or more and 0.25 part by mass or less of the component (B), and 0.015 part by mass or more and 0.25 part by mass or less of the component (C) with respect to 100 parts by mass of the component (A).

11 Claims, 1 Drawing Sheet

(51) Int. Cl.
*C08J 3/12* (2006.01)
*C08K 5/103* (2006.01)
*B29B 7/00* (2006.01)
*B29B 7/72* (2006.01)
*B29B 9/12* (2006.01)
*B29C 48/05* (2019.01)
*C08L 83/04* (2006.01)
*B29B 7/48* (2006.01)
*B29K 83/00* (2006.01)
*B29B 7/84* (2006.01)
*B29C 48/29* (2019.01)
*B29C 48/04* (2019.01)
*B29C 48/345* (2019.01)
*B29C 48/285* (2019.01)
*B29C 48/40* (2019.01)
*B29C 48/76* (2019.01)
*B29C 48/69* (2019.01)
*B29C 48/00* (2019.01)
*B29K 69/00* (2006.01)

(52) U.S. Cl.
CPC ............... *B29B 9/12* (2013.01); *B29C 48/05* (2019.02); *C08J 3/12* (2013.01); *C08K 5/103* (2013.01); *B29B 7/48* (2013.01); *B29B 7/845* (2013.01); *B29C 48/0022* (2019.02); *B29C 48/04* (2019.02); *B29C 48/286* (2019.02); *B29C 48/288* (2019.02); *B29C 48/29* (2019.02); *B29C 48/345* (2019.02); *B29C 48/40* (2019.02); *B29C 48/69* (2019.02); *B29C 48/767* (2019.02); *B29C 2948/92704* (2019.02); *B29C 2948/92904* (2019.02); *B29K 2069/00* (2013.01); *B29K 2083/00* (2013.01); *C08J 2369/00* (2013.01); *C08J 2483/04* (2013.01); *C08L 83/04* (2013.01)

(56) References Cited

FOREIGN PATENT DOCUMENTS

| | | |
|---|---|---|
| CN | 101432361 A | 5/2009 |
| CN | 101472993 A | 7/2009 |
| CN | 102047171 A | 5/2011 |
| CN | 102140237 A | 8/2011 |
| CN | 103975016 A | 8/2014 |
| EP | 1 167 449 A | 1/2002 |
| JP | S60-184814 A | 9/1985 |
| JP | H05-48162 B2 | 7/1993 |
| JP | 2002-012754 A | 1/2002 |
| JP | 2003-238791 A | 8/2003 |
| JP | 2007-242126 A | 9/2007 |
| JP | 2007-297534 A | 11/2007 |
| JP | 2007-332327 A | 12/2007 |
| JP | 2011-174031 A | 9/2011 |
| JP | 2012-041548 A | 3/2012 |
| JP | 2012-251013 A | 12/2012 |
| JP | 2013-035367 A | 2/2013 |
| TW | 201410782 A | 3/2014 |
| WO | WO-2012/141336 A1 | 10/2012 |
| WO | WO-2013/129709 A2 | 9/2013 |
| WO | WO-2016/194749 A1 | 12/2016 |

OTHER PUBLICATIONS

Office Action dated Feb. 28, 2020 for corresponding Chinese Patent Application No. 201680067628.0.
Office Action dated Apr. 28, 2020 for corresponding Taiwanese Patent Application No. 105136753.
Office Action dated Apr. 7, 2020 for corresponding Japanese Patent Application No. 2017-551828.
Office Action dated Dec. 1, 2020 for corresponding Chinese Patent Application No. 201680067628.0.

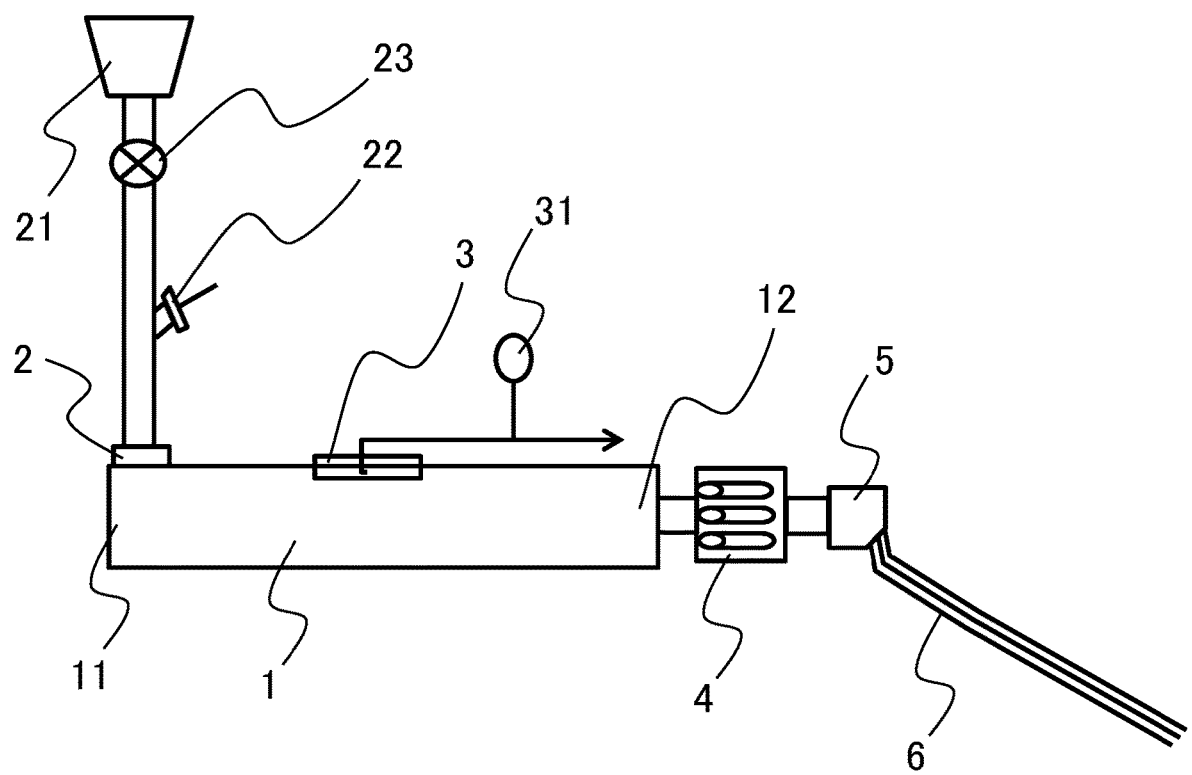

METHOD OF MANUFACTURING POLYCARBONATE RESIN PELLETS

RELATED APPLICATIONS

The present application claims priority under 37 U.S.C. § 371 to International Patent Application No. PCT/JP2016/083091, filed Nov. 8, 2016, which claims priority to and the benefit of Japanese Patent Application No. 2015-227956, filed on Nov. 20, 2015. The contents of these applications are hereby incorporated by reference in their entireties.

TECHNICAL FIELD

The present invention relates to a method of producing a polycarbonate resin pellet, and more specifically, to a method of producing a polycarbonate resin pellet in which even under severe molding conditions, such as high-temperature molding and a long retention time, a molded article hardly yellows, its releasability is not reduced, and the occurrence of an appearance failure of the molded article, such as silver, can be prevented.

BACKGROUND ART

A polycarbonate resin has excellent features, such as transparency, heat resistance, and mechanical characteristics, and hence has been used in a wide variety of applications including: casings for OA equipment and a home electric appliance, and members in an electrical and electronic field; optical materials, such as various optical disc substrates and lenses; carport roof materials; and various building materials. In addition, the production amount and applications of the resin have been increasing. In view of such background, various resin constructions that can bear various applications have been invented, and in, for example, Patent Document 1, there is a description that a molded body having not only excellent weatherability and excellent transparency but also satisfactory releasability is obtained by using a full ester of pentaerythritol and an aliphatic carboxylic acid, the full ester having a sodium content of 15 ppm or less, as a release agent, and a benzotriazole-based UV absorber. The molded body is assumed to be used particularly outdoors or indoors under irradiation with fluorescent light, and particularly when a UV-absorbing effect is required. The contents of the invention are as described below. To cope with a problem in that when the full ester of pentaerythritol and the aliphatic carboxylic acid serving as a release agent, and the benzotriazole-based UV absorber are used in combination, the effect of the UV absorber is not sufficiently exhibited, the sodium content is specified to achieve the effect. In the invention, however, no investigation has been made on the obtainment of a molded article that hardly causes silver or the like and is hence excellent in appearance.

In addition, in Patent Document 2, there is a description of an aromatic polycarbonate resin composition for a thin plate-storing/conveying container, and there is a description that an ester of a polyhydric alcohol and a higher fatty acid is incorporated into an aromatic polycarbonate resin, and a sodium content in the composition is set to 0.1 ppm or less. In Patent Document 2 described above, the surface contamination of a thin plate, such as a semiconductor wafer or a magnetic disk, which is considered to be sensitive to surface contamination, can be reduced, and the releasability of the composition at the time of its molding is improved.

When a polycarbonate resin is used as a light-guiding part, such as a lens in a vehicle field or for a projector, such as a headlamp lens, among, for example, lenses for lighting, a clear molded article that has achieved not only an improvement in releasability and a reduction in appearance failure but also, in particular, a reduced yellow tinge in addition to high heat resistance is required. In each of Patent Documents 1 and 2 described above, there is a description of a construction that achieves both releasability and a UV-absorbing effect, and achieves a reduction in surface contamination and an improvement in releasability. In each of the documents, however, there are no descriptions of a polycarbonate resin composition that can prevent the occurrence of an appearance failure, such as silver, and suppress the yellowing of a molded article without reducing the releasability of the molded article particularly in the production of a light-guiding part, and a molded article thereof.

CITATION LIST

Patent Document

Patent Document 1: JP 2012-251013 A
Patent Document 2: WO 2012/141336 A1

SUMMARY OF INVENTION

Technical Problem

A problem to be solved by the present invention is to provide a method of producing a polycarbonate resin pellet in which when a molded article is obtained by using a polycarbonate resin pellet, even under severe molding conditions, such as high-temperature molding and a long retention time, the molded article hardly yellows, its releasability is not reduced, and the occurrence of an appearance failure of the molded article, such as silver, can be prevented.

Solution to Problem

The inventor of the present invention has made extensive investigations, and as a result, has found that when a blend obtained by incorporating a silicone compound, and an ester of glycerin and a higher fatty acid into a polycarbonate resin is turned into a polycarbonate resin pellet with an extruder, a polycarbonate resin pellet obtained by setting the temperature of a molten resin at the outlet of the extruder within a specific range can suppress the yellowing of a molded article thereof and prevent the occurrence of an appearance failure of the molded article, such as silver, without reducing the releasability of the molded article. Thus, the inventor has completed the present invention.

That is, the present invention relates to the following items [1] to [15].

[1] A method of producing a polycarbonate resin pellet containing a polycarbonate resin serving as a component (A), a silicone compound serving as a component (B), and an ester of an aliphatic carboxylic acid having 12 to 22 carbon atoms and glycerin serving as a component (C), the production method comprising a step including introducing a blend containing the component (A), the component (B), and the component (C) into an extruder, and melt-kneading the blend in the extruder under such a condition that a temperature of a molten resin at an outlet of the extruder is 260° C. or more and 325° C. or less, followed by extrusion molding to provide a polycarbonate resin pellet, the resultant polycarbonate resin pellet containing 0.01 part by mass or more and 0.25 part by mass or less of the component (B), and 0.015 part by mass or more and 0.25 part by mass or less of the component (C) with respect to 100 parts by mass of the component (A).

[2] The method of producing a polycarbonate resin pellet according to the above-mentioned item [1], wherein a sodium content in the component (B) to be used in the blend is 15 ppm by mass or less.

[3] The method of producing a polycarbonate resin pellet according to the above-mentioned item [1] or [2], wherein the component (B) comprises a silicone compound in which at least one kind selected from the group consisting of a hydrogen atom, an alkoxy group, a hydroxy group, an epoxy group, and a vinyl group is bonded to a silicon atom.

[4] The method of producing a polycarbonate resin pellet according to any one of the above-mentioned items [1] to [3], wherein a sodium content in the component (A) to be used in the blend is 200 ppb by mass or less.

[5] The method of producing a polycarbonate resin pellet according to any one of the above-mentioned items [1] to [4], wherein a sodium content in the component (C) to be used in the blend is 2 ppm by mass or less.

[6] The method of producing a polycarbonate resin pellet according to any one of the above-mentioned items [1] to [5], wherein the component (C) comprises an ester of stearic acid and glycerin.

[7] The method of producing a polycarbonate resin pellet according to the above-mentioned item [6], wherein the ester of stearic acid and glycerin comprises glycerin monostearate.

[8] The method of producing a polycarbonate resin pellet according to any one of the above-mentioned items [1] to [7], wherein the component (A) comprises an aromatic polycarbonate resin.

[9] The method of producing a polycarbonate resin pellet according to any one of the above-mentioned items [1] to [8], wherein the component (A) has a viscosity-average molecular weight of 9,000 or more and 30,000 or less.

[10] The method of producing a polycarbonate resin pellet according to any one of the above-mentioned items [1] to [9], wherein the component (A) has a viscosity-average molecular weight of 10,000 or more and 20,000 or less.

[11] The method of producing a polycarbonate resin pellet according to any one of the above-mentioned items [1] to [10], wherein a water content in the component (A) is 50 ppm by mass or more and 3,000 ppm by mass or less.

[12] The method of producing a polycarbonate resin pellet according to any one of the above-mentioned items [1] to [11], wherein a water content in the blend is regulated by introducing 0.01 part by mass or more and 0.5 part by mass or less of water into the extruder.

[13] The method of producing a polycarbonate resin pellet according to the above-mentioned item [12], wherein an electrical conductivity of the water to be used in the regulation of the water content in the blend measured at 25° C. is 1 µS/m or less.

[14] The method of producing a polycarbonate resin pellet according to the above-mentioned item [13], wherein the water to be used in the regulation of the water content in the blend is supplied from a raw material-loading port of the extruder into the extruder.

[15] The method of producing a polycarbonate resin pellet according to any one of the above-mentioned items [1] to [14], wherein the extruder has a vent and the extrusion molding is performed under such a condition that a vacuum degree at an outlet of the vent is −700 mmHg or less.

Advantageous Effects of Invention

A molded article obtained by using a pellet obtained by the method of producing a polycarbonate resin pellet of the present invention has the following feature: even under severe molding conditions, such as high-temperature molding and a long retention time, its releasability from a mold is not reduced, the molded article hardly yellows, and the occurrence of an appearance failure of the molded article, such as silver, can be prevented.

BRIEF DESCRIPTION OF DRAWINGS

FIG. 1 is a schematic view for illustrating an example of an extruder to be used in a method of producing a polycarbonate resin pellet of the present invention.

DESCRIPTION OF EMBODIMENTS

A method of producing a polycarbonate resin pellet of the present invention is described in detail below. In this description, a specification considered to be preferred can be arbitrarily adopted, and a combination of preferred specifications can be said to be more preferred. In addition, the term "A to B" as used herein concerning the description of a numerical value means "A or more and B or less" (when A<B) or "A or less and B or more" (when A>B).

A method of producing a polycarbonate resin pellet of the present invention is a method of producing a polycarbonate resin pellet containing a polycarbonate resin serving as a component (A), a silicone compound serving as a component (B), and an ester of an aliphatic carboxylic acid having 12 to 22 carbon atoms and glycerin serving as a component (C), the production method comprising a step including introducing a blend containing the component (A), the component (B), and the component (C) into an extruder, and melt-kneading the blend in the extruder under such a condition that a temperature of a molten resin at an outlet of the extruder is 260° C. or more and 325° C. or less, followed by extrusion molding to provide a polycarbonate resin pellet, the resultant polycarbonate resin pellet containing 0.01 part by mass or more and 0.25 part by mass or less of the component (B), and 0.015 part by mass or more and 0.25 part by mass or less of the component (C) with respect to 100 parts by mass of the component (A).

[Blend to be introduced into Extruder]
<(A) Polycarbonate Resin>

In the method of producing a polycarbonate resin pellet of the present invention, the polycarbonate resin is used as the component (A). The polycarbonate resin may be an aromatic polycarbonate resin or an aliphatic polycarbonate resin, but the aromatic polycarbonate resin is preferably used because the resin is more excellent in impact resistance and heat resistance.

(Aromatic Polycarbonate Resin)

An aromatic polycarbonate resin produced by a reaction between an aromatic dihydric phenol and a carbonate precursor can be used as the aromatic polycarbonate resin. The aromatic polycarbonate resin can be used as a main component of the blend because the resin has satisfactory heat resistance, flame retardancy, and impact resistance as compared to the aliphatic polycarbonate resin.

Examples of the aromatic dihydric phenol may include: 4,4'-dihydroxydiphenyl; bis(4-hydroxyphenyl)alkanes, such as 1,1-bis(4-hydroxyphenyl)methane, 1,1-bis(4-hydroxyphenyl)ethane, and 2,2-bis(4-hydroxyphenyl)propane [bisphenol A]; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Among them, bisphenol A is preferred. The aromatic dihydric phenol may be a homopolymer using one kind of the aromatic dihydric phenols, or may be a copolymer using two or more kinds thereof. Further, a thermoplastic and randomly branched polycarbonate resin obtained by using a polyfunctional aromatic compound and the aromatic dihydric phenol in combination is permitted.

Examples of the carbonate precursor include a carbonyl halide, a haloformate, and a carbonate ester. Specific examples thereof include phosgene, a dihaloformate of a dihydric phenol, diphenyl carbonate, dimethyl carbonate, and diethyl carbonate.

A terminal stopper can be used as required in the production of the aromatic polycarbonate resin to be preferably used in the present invention. A known terminal stopper in the production of an aromatic polycarbonate resin only needs to be used as the terminal stopper. Specific examples of such compound may include phenol, p-cresol, p-tert-butylphenol, p-tert-octylphenol, p-cumylphenol, p-nonylphenol, and p-tert-amylphenol. Those monohydric phenols may each be used alone, or two or more kinds thereof may be used in combination.

The aromatic polycarbonate resin to be preferably used in the present invention may have a branching structure. A branching agent only needs to be used to introduce the branching structure, and there may be used, for example, compounds each having three or more functional groups, such as 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl) ethyl]benzene, phloroglucin, trimellitic acid, and isatinbis (o-cresol).

The viscosity-average molecular weight (Mv) of the polycarbonate resin serving as the component (A) to be used in the present invention is preferably from 9,000 to 40,000, more preferably from 9,000 to 30,000, still more preferably from 10,000 to 30,000, still further more preferably from 14,000 to 30,000 from the viewpoints of the physical properties of a resin composition, such as a mechanical strength. In addition, from the viewpoint that the resin composition is turned into an optical molded article, such as a light-guiding part, the viscosity-average molecular weight is preferably from 9,000 to 20,000, more preferably from 10,000 to 20,000, still more preferably from 11,000 to 18,000 in consideration of the moldability of the composition. The viscosity-average molecular weight (Mv) can be calculated from Schnell's equation ($[\eta]=1.23\times10^{-5}$ $Mv^{0.83}$) by measuring a limiting viscosity [η] through the measurement of the viscosity of a methylene chloride solution at 20° C. [concentration: g/L] with an Ubbelohde type viscometer.

In addition, in the present invention, when an aromatic polycarbonate-polyorganosiloxane copolymer, or a resin containing the aromatic polycarbonate-polyorganosiloxane copolymer is used as the polycarbonate resin, flame retardancy and impact resistance at low temperature can be improved. A polyorganosiloxane forming the copolymer is more preferably polydimethylsiloxane in terms of flame retardancy.

<(B) Silicone Compound>

In the method of producing a polycarbonate resin pellet of the present invention, the silicone compound is used as the component (B) in the blend to be introduced into the extruder. The silicone compound serving as the component (B) is used because the compound has the following effects: when the polycarbonate resin composition of the present invention is pelletized, the compound acts like a lubricant to suppress the yellowing of the pellet; and when the composition is molded, the compound prevents an appearance failure, such as silver.

A silicone compound having a hydrocarbon group having 1 to 12 carbon atoms on a silicon atom typified by a compound such as a polydimethylsiloxane, a polymethylethylsiloxane, or a polymethylphenylsiloxane can be used as the silicone compound serving as the component (B).

A straight silicone oil and a modified silicone oil can also each be used as the silicone compound serving as the component (B).

The straight silicone oil is a silicone compound in which an organic group bonded to a silicon atom is a methyl group, a phenyl group, or a hydrogen atom. Specific examples of the straight silicone oil include a dimethyl silicone oil in which all the side chains and terminals of a polysiloxane are methyl groups, a methyl phenyl silicone oil in which part of the side chains of a polysiloxane are phenyl groups, and a methyl hydrogen silicone oil in which part of the side chains of a polysiloxane are hydrogen atoms.

The modified silicone oil is a silicone compound obtained by introducing an organic group into a side chain or terminal of the straight silicone oil, and such oils are classified into a side-chain type oil, a two-terminal type oil, a one-terminal type oil, and a side-chain/two-terminal type oil in accordance with the position at which the organic group is introduced. Examples of the organic group to be introduced into the modified silicone oil include a hydrogen atom, an alkyl group, an aryl group, an aralkyl group, a fluoroalkyl group, an amino group, an amide group, an epoxy group, a mercapto group, a carboxy group, a polyether group, a hydroxy group, an alkoxy group, an aryloxy group, a polyoxyalkylene group, a vinyl group, an acryloyl group, and a methacryloyl group.

The silicone compound serving as the component (B) is preferably a polymer or copolymer formed of a structural unit represented by the following formula, and is preferably a silicone compound in which at least one kind selected from the group consisting of a hydrogen atom, an alkoxy group, a hydroxy group, an epoxy group, and a vinyl group is bonded to a silicon atom:

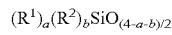

$(R^1)_a(R^2)_bSiO_{(4-a-b)/2}$ wherein: $R^1$ represents at least one kind selected from the group consisting of a hydrogen atom, an alkoxy group, a hydroxy group, an epoxy group, and a vinyl group; $R^2$ represents a hydrocarbon group having 1 to 12 carbon atoms; and a and b each represent an integer satisfying $0<a\leq 3$, $0\leq b<3$, and $0<a+b\leq 3$.

$R^1$ preferably represents a methoxy group or a vinyl group. In addition, examples of the hydrocarbon group represented by $R^2$ include a methyl group, an ethyl group, and a phenyl group.

Among the silicone compounds, a functional group-containing silicone compound formed of a structural unit containing a phenyl group as a hydrocarbon group represented by $R^2$ in the formula shows particularly high usefulness when used as the component (B) in the present invention. In addition, a compound containing one kind of organic group as an organic group represented by $R^1$ in the formula may be used, a compound containing two or more different kinds of organic groups as such organic groups may be used, or a mixture of these compounds may be used. In addition, a compound in which a value for a ratio "organic group ($R^1$)/hydrocarbon group ($R^2$)" in the formula is from 0.1 to 3, preferably from 0.3 to 2 is suitably used. Further, the silicone compound may be liquid or powdery. When the compound is liquid, its viscosity at room temperature is preferably from about 10 cSt to about 500,000 cSt. In addition, when the polycarbonate resin composition is used in optical applications, a difference in refractive index between the silicone compound and the polycarbonate resin is preferably made as small as possible, and the refractive index of the silicone compound is preferably from 1.45 to 1.65, more preferably from 1.48 to 1.60.

Sodium is incorporated into the silicone compound serving as the component (B) by its production process or the like, but in the present invention, a silicone compound having as low a sodium content as possible is preferably used. When the sodium content in the component (B) is high, part of the component (C) alters to be responsible for the occurrence of a modified product. The modified product is represented by the following formula (I), and may be, for example, a compound having a carbonate ester structure as a result of a reaction between the two hydroxy groups of a monoester:

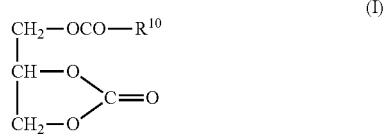

wherein in the formula (I), $R^{10}$ represents an alkyl group having 11 to 21 carbon atoms.

The component (B) having as low a sodium content as possible is preferably used because the modified product is assumed to be responsible for the yellowing of a molded article of a polycarbonate resin pellet to be obtained. In addition, when part of the component (C) alters, the content of the component (C) in the polycarbonate resin pellet may reduce to be responsible for the deterioration of the releasability of the molded article. The sodium content in the component (B) is preferably 15 ppm by mass or less, more preferably 10 ppm by mass or less. Although a commercial compound can be used as the component (B), even the sodium content of the commercial product may fluctuate. Further, even products that are available from the same manufacturer and are of the same grade may be different from each other in sodium content. Therefore, when the component (B) is used, the following procedure is preferably adopted: the sodium content in the component (B) is examined in advance, and the component (B) having a low sodium content is used; or the component is used after its sodium content has been reduced. The component (B) is colored pale yellow in some cases, and hence the component (B) colored to a small extent is preferably used.

A method involving performing an adsorption treatment with, for example, aluminum hydroxide, a synthetic hydrotalcite, magnesium silicate, aluminum silicate, or activated carbon has been known as a method of reducing the amount of a metal component, such as sodium, described above.

<(C) Ester of Aliphatic Carboxylic Acid Having 12 to 22 Carbon Atoms and Glycerin>

In the method of producing a polycarbonate resin pellet of the present invention, the ester of the aliphatic carboxylic acid having 12 to 22 carbon atoms and glycerin is used as the component (C) in the blend to be introduced into the extruder. The component (C) is used for improving releasability when a molded article is obtained by using the resultant polycarbonate resin pellet. The component (C) is obtained by subjecting the aliphatic carboxylic acid having 12 to 22 carbon atoms and glycerin to an esterification reaction to provide a monoester, a diester, or a triester. Herein, examples of the aliphatic carboxylic acid having 12 to 22 carbon atoms may include: saturated aliphatic carboxylic acids, such as dodecanoic acid, tridecanoic acid, tetradecanoic acid, pentadecanoic acid, hexadecanoic acid (palmitic acid), heptadecanoic acid, octadecanoic acid (stearic acid), and nonadecanoic acid; and unsaturated aliphatic carboxylic acids, such as oleic acid, linoleic acid, and linolenic acid. Among them, an aliphatic carboxylic acid having 14 to 20 carbon atoms is preferred, and stearic acid and palmitic acid are particularly preferred.

The aliphatic carboxylic acid, such as stearic acid, is often a mixture that is produced from a natural oil and fat, and contains any other carboxylic acid component having a different number of carbon atoms. Also in the fatty acid ester, an ester compound obtained from stearic acid or palmitic acid in the form of a mixture that is produced from a natural oil and fat, and contains any other carboxylic acid component is preferably used.

Specific example of the ester compound include ester compounds each containing glycerin monostearate, glycerin distearate, glycerin tristearate, glycerin monopalmitate, glycerin monobehenate, or the like as a main component. Among them, an ester compound containing glycerin monostearate or glycerin monopalmitate as a main component is preferably used. A compound having a monoglyceride ratio of 95% or more is more preferably used.

The component (C) is preferably an ester of stearic acid and glycerin, more preferably glycerin monostearate.

With regard to sodium contents in the component (A) and the component (C), as in the component (B), the component (A) and the component (C) each having a low sodium content are preferably used from the viewpoint of suppressing the production of the modified product considered to be derived from the component (C). The sodium content in the component (A) is preferably set to 200 ppb by mass or less, and the sodium content in the component (C) is set to preferably 10 ppm by mass or less, more preferably 5 ppm by mass or less, still more preferably 2 ppm by mass or less.

The sodium (Na) contents in the raw materials to be used were each determined by: adding sulfuric acid to 5 g of each of the measurement samples (raw materials to be used); subjecting the mixture to a heat ashing treatment; then dissolving the resultant in an aqueous solution of hydrochloric acid; and subjecting the aqueous solution to measurement based on inductively coupled plasma-atomic emission spectroscopy (ICP-AES). A determination lower limit by the measurement is 200 ppb by mass.

<Contents of Component (B) and Component (C) in Blend>

In the method of producing a polycarbonate resin pellet of the present invention, the content of the silicone compound serving as the component (B) in the blend to be introduced into the extruder is preferably from 0.01 part by mass to 0.25 part by mass with respect to 100 parts by mass of the polycarbonate resin serving as the component (A). A case in which the content of the component (B) is less than 0.01 part by mass is not preferred because when a molded article is obtained by using the polycarbonate resin composition, an appearance failure, such as silver, may occur on the surface of the molded article. In addition, a case in which the component (B) is incorporated at a content of more than 0.25 part by mass is also not preferred because the heat stability of the molded article cannot be further improved, but rather its YI is increased by a difference in refractive index between the component (B) and the polycarbonate resin, and hence its light transmittance is impaired. The content of the component (B) is more preferably from 0.03 part by mass to 0.20 part by mass, still more preferably from 0.05 part by mass to 0.15 part by mass.

In addition, the content of the ester of the aliphatic carboxylic acid having 12 to 22 carbon atoms and glycerin serving as the component (C) in the blend to be introduced into the extruder is preferably from 0.015 part by mass to 0.25 part by mass with respect to 100 parts by mass of the polycarbonate resin serving as the component (A). In the case where the content of the component (C) is set within the range, when a molded article is obtained by using the resultant polycarbonate resin pellet, its releasability can be made satisfactory, and a risk in that the component (C) adheres to the surface of a mold to adversely affect the appearance of the molded article reduces. The content of the component (C) is more preferably from 0.02 part by mass to 0.18 part by mass, still more preferably from 0.03 part by mass to 0.15 part by mass.

In the method of producing a polycarbonate resin pellet of the present invention, other additives except the component (B) and the component (C) can be incorporated into the blend to be introduced into the extruder. Those additives are described below.

<(D) Acrylic Resin>

An acrylic resin can be incorporated as a component (D) into the blend as required. The incorporation of the acrylic resin is suitable particularly in the case where a molded article is obtained by using a pellet obtained by the method of producing a polycarbonate resin pellet of the present invention, and the molded article is turned into an optical member, such as a light-guiding plate, because the total light transmittance of the molded article can be improved by the incorporation. The acrylic resin refers to a polymer containing, as a repeating unit, a monomer unit of each of acrylic acid, an acrylic acid ester, acrylonitrile, and derivatives thereof, and refers to a homopolymer or a copolymer with, for example, styrene or butadiene. Specific examples thereof include a polyacrylic acid, a polymethyl methacrylate (PMMA), a polyacrylonitrile, an ethyl acrylate-2-chloroethyl acrylate copolymer, a n-butyl acrylate-acrylonitrile copolymer, an acrylonitrile-styrene copolymer, an acrylonitrile-butadiene copolymer, and an acrylonitrile-butadiene-styrene copolymer. Among them, a polymethyl methacrylate (PMMA) can be particularly suitably used. The polymethyl methacrylate (PMMA), which may be a known polymethyl methacrylate, is preferably a polymethyl methacrylate produced by subjecting a methyl methacrylate monomer to bulk polymerization in the presence of a peroxide or an azo-based polymerization initiator.

The weight-average molecular weight of the acrylic resin serving as the component (D) is preferably from 200 to 100,000, more preferably from 20,000 to 60,000. When the weight-average molecular weight falls within the range, phase separation between the polycarbonate resin and the acrylic resin hardly occurs at the time of the molding of the pellet, and hence a risk in that light-guiding performance when the resultant molded article is turned into a light-guiding plate is adversely affected reduces. When the acrylic resin serving as the component (D) is incorporated, its content is preferably from 0.01 part by mass to 0.5 part by mass, more preferably from 0.02 part by mass to 0.4 part by mass, particularly preferably from 0.03 part by mass to 0.15 part by mass with respect to 100 parts by mass of the polycarbonate resin serving as the component (A).

<(E) Antioxidant>

An antioxidant can be incorporated as a component (E) into the blend as required. At least one kind selected from the group consisting of a phenol-based antioxidant, a phosphorus-based antioxidant, and a sulfur-based antioxidant can be used as the antioxidant.

The phenol-based antioxidant is not particularly limited, and a hindered phenol-based antioxidant is suitably used. Typical examples thereof include octadecyl-3-(3,5-di-tert-butyl-4-hydroxyphenyl)propionate, triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythrityl-tetrakis[3-(3,5-di-tert-butyl-4-hydroxyphenyl)propionate], N,N'-hexamethylenebis[(3,5-di-tert-butyl-4-hydroxy)-hydrocinnamamide], 2,2-thio-diethylenebis[3-(3,5-di-tert-butyl-4-hydroxyphenyl) propionate], 2,4-bis(n-octylthio)-6-(4-hydroxy-3,5-di-tert-butylanilino)-1,3,5-triazine, 1,3,5-trimethyl-2,4,6-tris(3,5-di-tert-butyl-4-hydroxybenzyl)benzene, and tris-(3,5-di-tert-butyl-4-hydroxybenzyl)-isocyanurate.

The phosphorus-based antioxidant is not particularly limited, and examples thereof include triphenyl phosphite, diphenyl nonyl phosphite, diphenyl(2-ethylhexyl) phosphite, tris(2,4-di-tert-butylphenyl) phosphite, trisnonylphenyl phosphite, diphenyl isooctyl phosphite, 2,2'-methylenebis(4,6-di-tert-butylphenyl)octyl phosphite, diphenyl isodecyl phosphite, diphenyl mono(tridecyl) phosphite, phenyl diisodecyl phosphite, phenyl di(tridecyl) phosphite, tris (2-ethylhexyl) phosphite, tris(isodecyl) phosphite, tris(tridecyl) phosphite, dibutyl hydrogen phosphite, trilauryl trithiophosphite, tetrakis(2,4-di-tert-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-tert-butylphenyl) ditridecyl phosphite, 1,1,3-tris(2-methyl-4-tridecyl phosphite-5-tert-butylphenyl)butane, bis(2,6-di-tert-butylphenyl)pentaerythritol diphosphite, bis(2,4-dicumylphenyl)pentaerythritol diphosphite, 3,4:5,6-dibenzo-1,2-oxaphosphane, triphenylphosphine, diphenylbutylphosphine, diphenyloctadecylphosphine, tris-(p-tolyl)phosphine, tris-(p-nonylphenyl)phosphine, tris-(naphthyl)phosphine, diphenyl-(hydroxymethyl)-phosphine, diphenyl-(acetoxymethyl)-phosphine, diphenyl-(β-ethylcarboxyethyl)-phosphine, tris-(p-chlorophenyl)phosphine, tris-(p-fluorophenyl)phosphine, diphenylbenzylphosphine, diphenyl-β-cyanoethylphosphine, diphenyl-(p-hydroxyphenyl)-phosphine, diphenyl-1,4-dihydroxyphenyl-2-phosphine, and phenylnaphthylbenzylphosphine.

The content of the antioxidant is preferably from 0.003 part by mass to 0.5 part by mass, more preferably from 0.003 part by mass to 0.2 part by mass, still more preferably from 0.01 part by mass to 0.2 part by mass with respect to 100 parts by mass of the polycarbonate resin serving as the component (A). When the antioxidant is incorporated at a content within such range, the heat stability of a molded article can be improved.

<(F) Alicyclic Epoxy Compound>

An alicyclic epoxy compound can be incorporated as a component (F) into the blend as required. The alicyclic epoxy compound serving as the component (F) is a cyclic aliphatic compound having an alicyclic epoxy group, that is, an epoxy group in which one oxygen atom is added to an ethylene bond in an aliphatic ring. Specifically, compounds represented by the following formulae (1) to (10) described in JP 11-158364 A are each suitably used.

(1)
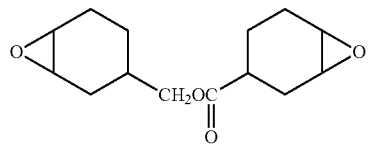

(2)
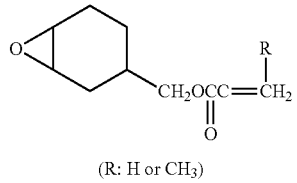
(R: H or CH₃)

(3)
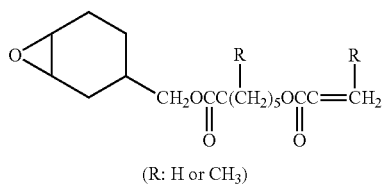
(R: H or CH₃)

(4)
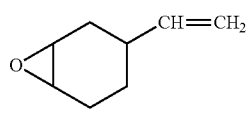

(5)
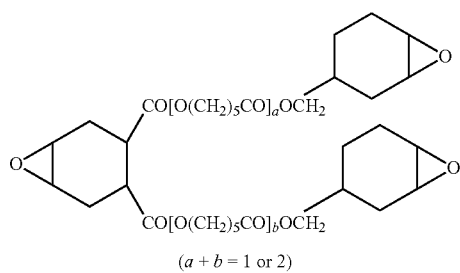
($a + b = 1$ or 2)

(6)
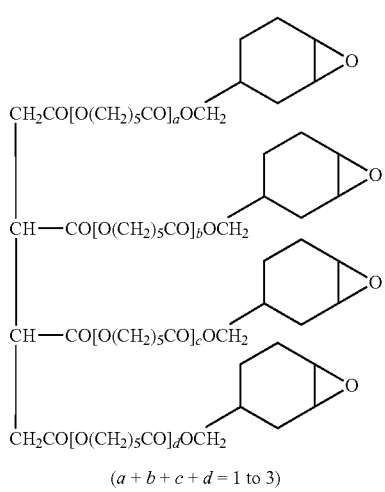
($a + b + c + d = 1$ to 3)

(7)
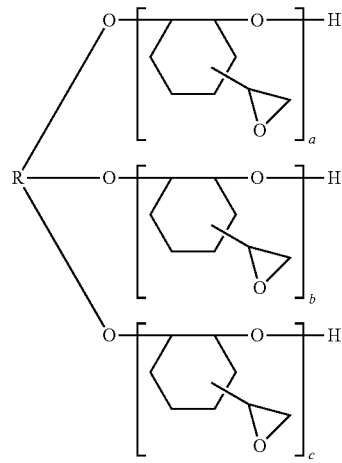
($a + b + c = n$ (integer), R: hydrocarbon group)

(8)
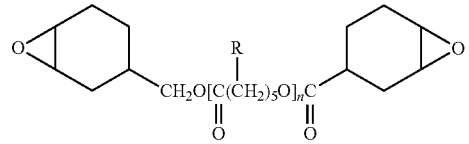
($n$: integer, R: hydrocarbon group)

(9)
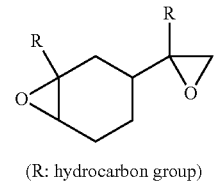
(R: hydrocarbon group)

(10)
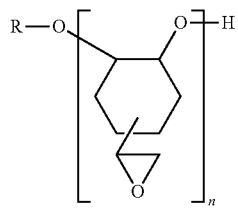
($n$: integer, R: hydrocarbon group)

Among the alicyclic epoxy compounds, a compound represented by the formula (1), the formula (7), or the formula (10) is more preferably used because the compound is excellent in compatibility with the polycarbonate resin and hence does not impair its transparency.

The blending of the alicyclic epoxy compound into the polycarbonate resin can improve its hydrolysis resistance.

The content of the alicyclic epoxy compound serving as the component (F) is preferably from 0.005 part by mass to 0.05 part by mass with respect to 100 parts by mass of the polycarbonate resin serving as the component (A).

Any other additive, such as a UV absorber, a flame retardant, a flame retardant aid, a light stabilizer, a plasticizer, an antistatic agent, an antiblocking agent, an antimicrobial agent, a compatibilizer, a colorant (a dye or a pigment), a lubricant, or a reinforcing filler, such as a glass fiber, can be incorporated into the blend as required to the extent that the effects of the present invention are not impaired.

In addition, a water content in the component (A) to be introduced into the extruder is preferably from 50 ppm by mass to 3,000 ppm by mass, more preferably from 100 ppm by mass to 1,000 ppm by mass, still more preferably from 250 ppm by mass to 500 ppm by mass. Further, in consideration of the water content in the component (A), water is preferably introduced into the extruder for regulating a water content in the blend. When the amount of the water to be introduced is set within the range of preferably from 0.01 part by mass to 0.5 part by mass, more preferably from 0.05 part by mass to 0.3 part by mass, the water content in the blend can be regulated within an optimum range, and hence the alteration of part of the component (B) can be prevented. When water is added to the extruder in the regulation of the water content in the blend, water having an electrical conductivity measured at 25° C. of 1 µS/m or less is preferably added. The water having an electrical conductivity of 1 µS/m or less can be preferably used because the content of impurities, such as sodium, in the water is small. The water to be used in the regulation of the water content in the blend is preferably supplied from the raw material-loading port of the extruder into the extruder.

[Polycarbonate Resin Pellet]

<Production of Polycarbonate Resin Pellet>

The blend containing the component (A), the component (B), the component (C), and an additive to be used as required is introduced into the extruder after the components have been mixed with a mixer, such as a ribbon blender, a Henschel mixer, a Banbury mixer, or a drum tumbler, in advance, or is introduced into the extruder directly without the mixing. A single-screw extruder, a twin-screw extruder, a co-kneader, a multi-screw extruder, or the like can be used as the extruder.

FIG. 1 is a schematic view for illustrating an example of the extruder to be used in the method of producing a polycarbonate resin pellet of the present invention. In FIG. 1, a twin-screw extruder 1 has a raw material-loading port 2 and a vent 3. The raw material-loading port 2 is arranged on an inlet side 11 of the twin-screw extruder 1. In FIG. 1, the twin-screw extruder 1 has the one vent 3, but the number of the vents is not limited to one. A raw material hopper 21 and a water-introducing port 22 are connected to the raw material-loading port 2, and a rotary valve 23 is arranged between the raw material-loading port 2 and the raw material hopper 21. A vacuum pressure gauge 31 is connected to the vent 3. A polymer filter 4 and a die 5 are connected to an outlet side 12 of the twin-screw extruder 1, and the die 5 is connected to the twin-screw extruder 1 through the polymer filter 4. A resin is extruded as a strand 6 from the die 5.

In the introduction of the blend into the extruder, the blend is preferably introduced into the extruder in a quantitative manner with a rotary valve, a weight-control type constant feeder, or the like. In addition, in the introduction of the component (A), the component (B), the component (C), and the additive to be used as required into the extruder, the respective components are preferably continuously introduced in a quantitative manner so that the blending amounts described above with respect to the component (A) may be obtained. Further, the following procedure may be adopted: a master batch is produced by adding the component (C) and the additive to be used as required to the component (A), and the component (A), the component (C), and the master batch are introduced into the extruder. In addition, when the component (B) is a liquid, the component may be introduced by arranging a supply port in the shoot portion of the extruder.

The blend introduced into the extruder is melt-kneaded, and is extruded as a strand from a die at the outlet of the extruder. A polymer filter for removing gel and any other foreign matter is preferably arranged on the upstream side of the die of the extruder. A filter used in a filtration treatment can be used as the polymer filter to be used. A filter type is specifically, for example, a candle type, a pleat type, or a leaf disc type, and a filter material is, for example, a sintered metal filter, a metal fiber nonwoven fabric filter, a ceramic filter, or a membrane filter made of a heat-resistant resin. The filtration accuracy of the filter is preferably 50 µm or less, more preferably 30 µm or less, still more preferably 10 µm or less. When the filtration accuracy is about 10 µm, the gel and the other foreign matter can be suitably removed.

The strand extruded from the die of the extruder is cooled by water cooling or the like, and is cut with a pelletizer. Thus, a pellet having a predetermined length can be obtained. A pellet of a cylindrical shape or an elliptic cylindrical shape typically having the following pellet size can be obtained: a pellet diameter is from 2 mm to 5 mm and a pellet length is from 2 mm to 6 mm.

In the method of producing a polycarbonate resin pellet of the present invention, the temperature of the molten resin at the outlet of the die of the extruder needs to be set to from 260° C. to 325° C. A case in which the temperature of the molten resin is less than 260° C. is not preferred because the viscosity of the molten resin in the extruder increases to make it difficult for the molten resin to pass the inside of the filter arranged for removing gel and any other foreign matter. In addition, a case in which the temperature of the molten resin is more than 325° C. is not preferred because when the resultant pellet is turned into a molded article, its yellowing is liable to occur. The temperature of the molten resin is preferably set to from 270° C. to 320° C. The temperature of the molten resin can be easily measured with, for example, a non-contact type thermometer using an infrared ray.

In addition, it is preferred that a vent for removing volatile matter be arranged in the extruder to be used, and a vacuum degree at the outlet of the vent be set to −700 mmHg or less. Thus, water and impurities in the polycarbonate resin serving as the component (A) can be removed.

Thus, a polycarbonate resin pellet can be produced.

<Contents of Component (B) and Component (C) in Polycarbonate Resin Pellet>

In the method of producing a polycarbonate resin pellet of the present invention, the content of the component (B) in the polycarbonate resin pellet to be obtained needs to be from 0.01 part by mass to 0.25 part by mass with respect to 100 parts by mass of the component (A). A case in which the content of the component (B) is less than 0.01 part by mass is not preferred because when a molded article is obtained by using the polycarbonate resin pellet, an appearance failure, such as silver, may occur on the surface of the molded article. In addition, a case in which the component (B) is incorporated at a content of more than 0.25 part by mass is not preferred because the YI of the molded article is increased by a difference in refractive index between the component (B) and the polycarbonate resin, and hence its light transmittance is impaired. The content of the component (B) is preferably from 0.03 part by mass to 0.20 part by mass, more preferably from 0.05 part by mass to 0.15 part by mass with respect to 100 parts by mass of the component (A). The content of the component (B) in the polycarbonate resin pellet can be measured by gas chromatography, but the content of the component (B) does not largely change from its blending amount before the melt kneading.

In the method of producing a polycarbonate resin pellet of the present invention, the content of the component (C) in the polycarbonate resin pellet to be obtained needs to be from 0.015 part by mass to 0.25 part by mass with respect to 100 parts by mass of the component (A). A case in which the content of the component (C) is less than 0.015 part by mass is not preferred because when a molded article is obtained by using the polycarbonate resin pellet, its releasability deteriorates. In addition, a case in which the content of the component (C) is more than 0.25 part by mass is not preferred because there is a risk in that the component (C) adheres to the surface of a mold to adversely affect the surface appearance of a product. The content of the component (C) is preferably from 0.02 part by mass to 0.18 part by mass, more preferably from 0.3 part by mass to 0.15 part by mass with respect to 100 parts by mass of the component (A). The content of the component (C) in the polycarbonate resin pellet can be measured by gas chromatography.

That is, in order that the contents of the component (B) and the component (C) in the polycarbonate resin pellet may be set to the foregoing contents, the contents of the component (B) and the component (C) in the blend to be introduced into the extruder only need to be set to the same blending amounts as the contents of the component (B) and the component (C) in the polycarbonate resin pellet described above. In addition, the same holds true for the other components to be added including the component (D) and the component (E).

<Modification Ratio of Component (C) in Polycarbonate Resin Pellet>

The modification ratio of the component (C) in the polycarbonate resin pellet is preferably 30% or less. In the case where the modification ratio of the component (C) is set to 30% or less, when the pellet is turned into a molded article, an increase in yellow index of the molded article can be suppressed. The modification ratio of the component (C) can be determined as a ratio "[(content of modified product derived from component (C) in pellet)/[content of component (C) in pellet+content of modified product derived from component (C) in pellet]]×100(%)" by measuring the content of the component (C) in the polycarbonate resin pellet and the content of a modified product derived from the component (C) therein.

Various molded articles can be obtained by molding involving using the polycarbonate resin pellet described above.

Various conventionally known molding methods can each be used as a method of molding the pellet, and examples thereof include an injection molding method, an injection compression molding method, an extrusion molding method, a blow molding method, a press molding method, a vacuum molding method, and a foam molding method. In the injection molding, a general injection molding method or a general injection compression molding method, or a special molding method, such as a gas assist molding method, can be used.

A molding temperature in the production of each of the molded articles is preferably from 260° C. to 340° C., more preferably from 280° C. to 320° C.

Further, the extrusion molding of the polycarbonate resin pellet can provide a sheet-like molded article. When the sheet-like molded article is obtained by the extrusion molding, a known extrusion molding machine, such as a T-die extruder, can be used. A molding temperature in the production of the sheet-like molded article is preferably from 240° C. to 300° C., more preferably from 250° C. to 280° C.

When a molded article obtained by using the polycarbonate resin pellet obtained by the method of producing a polycarbonate resin pellet of the present invention is used as an appearance member, a molding technology intended for an improvement in appearance, such as a heat cycle molding method, a high-temperature mold, or an insulated runner mold, can be used.

In addition, when it is required that a molded article part be made flame-retardant, a molding technology, such as laminate molding or two-color molding with a resin material having flame retardancy, can be used.

In order to obtain a large and thin-walled injection-molded body, injection compression molding, or high-pressure or ultrahigh-pressure injection molding can be used, and in the molding of a molded article having a partial thin-walled portion, partial compression molding or the like can be used.

The molded article can be used in various applications including: lighting covers; protective covers; casings for OA equipment, a copying machine, and a home electric appliance; lenses; electrical and electronic parts; and window products; the molded article can be suitably used particularly as an optical molded article utilizing light permeability, more specifically, as a light-guiding part because its releasability is not reduced, the molded article hardly yellows, and the occurrence of a failure of the molded article, such as silver, can be prevented. Such light-guiding part can be suitably used particularly as: a light-guiding plate for a liquid crystal display (light-guiding plate for a liquid crystal panel) of a smartphone, a laptop personal computer, a television, or the like; or a light-guiding part for a vehicle, such as an automobile, a railway vehicle, or a motorized bicycle. In recent years, daytime running light regulations have been specified in areas typified by Europe for improving the visibility of an automobile in the daytime, and in a twilight time zone before and after sunset. The molded article using the polycarbonate resin pellet of the present invention can be suitably utilized as light-guiding parts for vehicles including a light-guiding part for an automobile intended for a daytime running light.

EXAMPLES

The present invention is hereinafter described in more detail by way of Examples. The present invention is not limited by these Examples. Measurements and evaluations in Examples and Comparative Examples were performed by the following methods.

<Measurement of Resin Temperature at Outlet of Die>

Various methods are conceivable for measuring the temperature of a molten resin at the outlet of a die. Examples of the conceivable methods include: a method involving bringing a thermocouple into direct contact with the molten resin ejected from the outlet of the die to measure the temperature; a method involving arranging a thermocouple in die hardware and bringing a terminal tip portion of the thermocouple into direct contact with the molten resin in the die hardware to measure the temperature; and a method involving measuring the temperature with an infrared thermometer or the like in a non-contact manner.

The temperature of the molten resin in the present invention was measured with a non-contact type high-sensitivity infrared thermometer ("ThermoGear G100EX" manufactured by Nippon Avionics Co., Ltd.). The measurement requires emissivity setting intrinsic to a substance to be measured. An emissivity was determined so that the temperature of the molten resin collected from the outlet of the die of an extruder showed the same temperature as a temperature measured with a thermocouple type thermometer. It was confirmed that in the polycarbonate resin composition of the present invention, the temperature of the molten resin showed the same temperature as that measured with the thermocouple type thermometer when the emissivity was set to 0.85.

The measurement of the temperature of the molten resin was performed by the following method. The infrared thermometer was mounted and fixed on a tripod at a place distant from the outlet of the die by about 1 m. The temperature of the molten resin at a site distant from the outlet of the die by about 5 cm was observed with the infrared thermometer every 1 minute, and the average of the temperature measured values during a time period of about 30 minutes was defined as the temperature of the molten resin.

<Sodium (Na) Content>

Sodium (Na) contents in raw materials to be used were each determined by: adding sulfuric acid to 5 g of each of the measurement samples (raw materials to be used); subjecting the mixture to a heat ashing treatment; then dissolving the resultant in an aqueous solution of hydrochloric acid; and subjecting the aqueous solution to measurement based on inductively coupled plasma-atomic emission spectroscopy (ICP-AES). 720-ES manufactured by Agilent Technologies, Inc. was used as a measuring machine. A determination lower limit by the measurement is 200 ppb by mass.

<Contents of Component (C) and Modified Product of Component (C) in Pellet>

2.0 g of a pellet formed of a polycarbonate resin composition was dissolved in 15 mL of chloroform. 25 mL of methanol was added to the solution to reprecipitate a polycarbonate, and the mixture was left at rest. After that, 20 mL of a supernatant was concentrated to dryness. The resultant dried product was redissolved in 3 mL of DMF, and a silylation treatment was performed by adding 1 mL of an N,O-bis(trimethylsilyl)acetamide (BSA) reagent to the solution and stirring the mixture. The resultant reaction product was subjected to quantitative analysis by mounting a gas chromatograph including a hydrogen flame ionization detector ("Model 7890A" manufactured by Agilent Technologies, Inc.) with a column "DB-1" (having a length of 15 m, a diameter of 0.53 mm, and an inner diameter of 1.5 μm). The following conditions were adopted as measurement conditions.

The temperature of an injection port was 330° C., the temperature of the detector was 330° C., the temperature of an oven was increased from 120° C. to 330° C. under the condition of a rate of temperature increase of 10° C./min, and the reaction product was injected in an amount of 1 μL.

The contents of the component (C) and a modified product derived from the component (C), the modified product being represented by the following formula (II), were each determined by using a calibration curve created in advance, and a modification ratio was determined by the following method. A determination lower limit by the measurement is 30 ppm by mass.

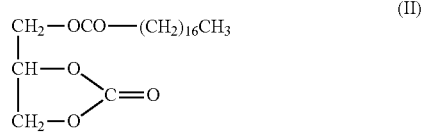

(II)

The modification ratio of the component (C) was determined as a ratio "[(content of modified product derived from component (C) in pellet)/[content of component (C) in pellet+content of modified product derived from component (C) in pellet]]×100(%)." When the content of the modified product derived from the component (C) in the pellet was less than the determination lower limit, that is, 30 ppm by mass, the term "incalculable" was described.

<Measurement of YI Value>

In recent years, an increase in size of a molded article and the thinning thereof have been advancing, and hence a resin is molded at a temperature higher than the cylinder temperature setting of a molding machine recommended as a molding condition for the resin in some cases. Accordingly, the YI value of a molded body was evaluated at 350° C. serving as a severer temperature condition.

A pellet formed of a polycarbonate resin composition was subjected to injection molding with an injection molding machine at an injection molding temperature of 350° C. to provide a flat-plate test piece having a size measuring 80 mm by 40 mm by 3 mm thick. The yellow index (YI) value of the test piece was measured with a spectrophotometer "SE-2000" (manufactured by Nippon Denshoku Industries Co., Ltd.) under the conditions of a C light source and a two-degree field of view. As the numerical value becomes higher, the yellow index of the test piece is higher, which means that the test piece is colored to a larger extent. In the measurement of the YI value, the YI values of a flat-plate test piece molded in a normal cycle (retention time: 30 seconds) and a flat-plate test piece molded by retaining the pellet in the injection molding machine for 10 minutes were measured and determined. A higher YI value after the retention for 10 minutes means that the test piece is poorer in heat resistance. The injection molding was performed while the cylinder temperature of the injection molding machine was kept at 350° C.

<Evaluation of Releasability>

When the flat-plate test piece obtained by the injection molding in the measurement of the YI value was removed from a mold, its releasability was evaluated by the following criteria.

A: The flat-plate test piece was able to be removed from the mold without its breakage.

B: When the flat-plate test piece was removed from the mold, the breakage of part of the flat-plate test piece was observed.

<Presence or Absence of Occurrence of Silver>

The surface appearance (presence or absence of the occurrence of silver) of the flat-plate test piece obtained by the molding after the retention in the injection molding machine for 10 minutes was visually evaluated in accordance with the following evaluation criteria.

A: No silver is observed.
B: Silver is observed.

Examples 1 to 9 and Comparative Examples 1 to 6

The components (A) to (E) were used in blending amounts shown in Table 1, and were melt-kneaded with a vented twin-screw extruder (manufactured by Toshiba Machine Co., Ltd., "TEM-37SS," L/D=40.5) while a condition was adjusted so that a resin temperature shown in Table 1 was obtained. Thus, pellets were obtained. The pellets were each obtained by adding ion-exchanged water (electrical conductivity: 1 μS/m or less) in an amount shown in Table 1 with respect to 100 parts by mass of the component (A) from the raw material-loading port of the vented twin-screw extruder in the melt kneading with the extruder. A pressure at a vent was reduced to a vacuum degree of −720 mmHg. The results of the evaluations of the resultant pellets each formed of a polycarbonate resin composition and the results of the evaluations of test pieces obtained by subjecting the pellets to injection molding are shown in Table 1. In Comparative Example 3, no pellet could be produced because strange noise was produced from the extruder.

Silicone compounds of the same grade available under the product name "KR-511" from Shin-Etsu Chemical Co., Ltd. were used as silicone compounds serving as the components (B) used in Examples and Comparative Examples, and 6 lots of silicone compounds "KR-511 (a) to KR-511 (e)" that were of the same grade but were different from one another in sodium content were used.

TABLE 1

| | | | | Example | | | | |
|---|---|---|---|---|---|---|---|---|
| | | | | 1 | 2 | 3 | 4 | 5 |
| Composition of blend (part(s) by mass) | (A) Polycarbonate resin | FN1500 *1 | | 100 | 100 | 100 | 100 | 100 |
| | (B) Silicone compound | KR-511(a) *2 | | — | — | — | — | — |
| | | KR-511(b) *3 | | — | — | — | — | — |
| | | KR-511(c) *4 | | 0.1 | 0.1 | 0.1 | 0.05 | 0.15 |
| | | KR-511(d) *5 | | — | — | — | — | — |
| | | KR-511(e) *6 | | — | — | — | — | — |
| | (C) Glycerin ester | S-100A *7 | | 0.03 | 0.015 | 0.05 | 0.03 | 0.03 |
| | (D) Acrylic resin | BR-83 *8 | | 0.1 | 0.1 | 0.1 | 0.1 | 0.1 |
| | (E) Antioxidant | PEP-36A *9 | | 0.05 | 0.05 | 0.05 | 0.05 | 0.05 |
| Pellet molding condition | Addition amount of pure water (part(s) by mass) | | | 0.1 | 0.1 | 0.1 | 0.1 | 0.1 |
| | Temperature of molten resin at outlet of extruder (° C.) | | | 307 | 307 | 307 | 307 | 307 |
| Content of component (C) in pellet (part(s) by mass) | | | | 0.03 | 0.014 | 0.043 | 0.029 | 0.029 |
| Content of modified product of component (C) in pellet (part(s) by mass) | | | | Measurement lower limit | Measurement lower limit | 0.005 | Measurement lower limit | Measurement lower limit |
| Modification ratio of component (C) (%) | | | | Incalculable | Incalculable | 10 | Incalculable | Incalculable |
| YI value (YI retention test, 3-millimeter thick, flat plate) | | Normal cycle | | 1.15 | 1.14 | 1.18 | 1.10 | 1.22 |
| | | Retention for 10 minutes | | 1.31 | 1.33 | 1.37 | 1.29 | 1.44 |
| Releasability | | | | A | A | A | A | A |
| Presence or absence of occurrence of silver | | | | A | A | A | A | A |

| | | | | Example | | | |
|---|---|---|---|---|---|---|---|
| | | | | 6 | 7 | 8 | 9 |
| Composition of blend (part(s) by mass) | (A) Polycarbonate resin | FN1500 *1 | | 100 | 100 | 100 | 100 |
| | (B) Silicone compound | KR-511(a) *2 | | — | — | — | — |
| | | KR-511(b) *3 | | 0.1 | — | — | — |
| | | KR-511(c) *4 | | — | 0.1 | — | — |
| | | KR-511(d) *5 | | — | — | 0.1 | — |
| | | KR-511(e) *6 | | — | — | — | 0.1 |
| | (C) Glycerin ester | S-100A *7 | | 0.03 | 0.03 | 0.03 | 0.03 |
| | (D) Acrylic resin | BR-83 *8 | | 0.1 | 0.1 | 0.1 | 0.1 |
| | (E) Antioxidant | PEP-36A *9 | | 0.05 | 0.05 | 0.05 | 0.05 |
| Pellet molding condition | Addition amount of pure water (part(s) by mass) | | | 0.1 | 0.1 | 0.1 | 0.1 |
| | Temperature of molten resin at outlet of extruder (° C.) | | | 320 | 320 | 320 | 320 |
| Content of component (C) in pellet (part(s) by mass) | | | | 0.022 | 0.029 | 0.021 | 0.02 |
| Content of modified product of component (C) in pellet (part(s) by mass) | | | | Measurement lower limit | Measurement lower limit | 0.004 | 0.003 |
| Modification ratio of component (C) (%) | | | | Incalculable | Incalculable | 16 | 13 |
| YI value (YI retention test, 3-millimeter thick, flat plate) | | Normal cycle | | 1.14 | 1.13 | 1.17 | 1.18 |
| | | Retention for 10 minutes | | 1.36 | 1.33 | 1.48 | 1.50 |
| Releasability | | | | A | A | A | A |
| Presence or absence of occurrence of silver | | | | A | A | A | A |

| | | | | Comparative Example | | | | | |
|---|---|---|---|---|---|---|---|---|---|
| | | | | 1 | 2 | 3 | 4 | 5 | 6 |
| Composition of blend (part(s) by mass) | (A) Polycarbonate resin | FN1500 *1 | | 100 | 100 | 100 | 100 | 100 | 100 |
| | (B) Silicone compound | KR-511(a) *2 | | — | — | — | — | — | — |
| | | KR-511(b) *3 | | 0.1 | — | 0.1 | — | — | 0.1 |
| | | KR-511(c) *4 | | — | — | — | — | 0.3 | — |
| | | KR-511(d) *5 | | — | — | — | — | — | — |
| | | KR-511(e) *6 | | — | 0.1 | — | — | — | — |
| | (C) Glycerin ester | S-100A *7 | | 0.03 | 0.03 | 0.03 | 0.03 | 0.04 | — |
| | (D) Acrylic resin | BR-83 *8 | | 0.1 | 0.1 | 0.1 | 0.1 | 0.1 | 0.1 |
| | (E) Antioxidant | PEP-36A *9 | | 0.05 | 0.05 | 0.05 | 0.05 | 0.05 | 0.05 |
| Pellet molding condition | Addition amount of pure water (part(s) by mass) | | | 0.1 | 0.1 | 0.1 | 0.1 | 0.1 | 0.1 |
| | Temperature of molten resin at outlet of extruder (° C.) | | | 340 | 340 | 230 | 320 | 287 | 320 |
| Content of component (C) in pellet (part(s) by mass) | | | | 0.029 | 0.014 | — | 0.029 | 0.029 | — |
| Content of modified product of component (C) in pellet (part(s) by mass) | | | | Measurement lower limit | 0.007 | — | Measurement lower limit | 0.01 | — |
| Modification ratio of component (C) (%) | | | | Incalculable | 33 | — | Incalculable | 26 | — |
| YI value | | Normal cycle | | 1.19 | 1.23 | — | 1.16 | 1.47 | 1.15 |

TABLE 1-continued

| | | | | | | |
|---|---|---|---|---|---|---|
| (YI retention test, 3-millimeter thick, flat plate) | Retention for 10 minutes | 1.52 | 1.56 | — | 1.40 | 1.84 | 1.32 |
| Releasability | | A | A | — | A | A | B |
| Presence or absence of occurrence of silver | | A | A | — | B | A | A |

Examples 10 and 11

The components (A) to (E) were used in blending amounts shown in Table 2, and were melt-kneaded with a vented twin-screw extruder including a polymer filter unit between an extruder cylinder and a die (manufactured by The Japan Steel Works, Ltd., "TEX160α," L/D=31.5) while a condition was adjusted so that a resin temperature shown in Table 2 was obtained. Thus, pellets were obtained. A leaf disc type filter having an absolute filtration accuracy of 10 μm was used in the polymer filter unit. The pellets were each obtained by adding ion-exchanged water (electrical conductivity: 1 μS/m or less) in an amount shown in Table 2 with respect to 100 parts by mass of the component (A) from the raw material-loading port of the vented twin-screw extruder in the melt kneading with the extruder. A pressure at a vent was reduced to a vacuum degree of −720 mmHg. The results of the evaluations of the resultant pellets each formed of a polycarbonate resin composition and the results of the evaluations of test pieces obtained by subjecting the pellets to injection molding are shown in Table 2.

The results of Tables 1 and 2 show that when a molded article is obtained by using any one of the polycarbonate resin pellets obtained in Examples 1 to 11, its releasability does not reduce, the molded article hardly yellows, and the occurrence of silver is prevented. Meanwhile, the results of Table 1 show that when a molded article is obtained by using any one of the polycarbonate resin pellets obtained in Comparative Examples 1 to 6, its releasability reduces, the molded article yellows, or silver occurs in the molded article.

INDUSTRIAL APPLICABILITY

When a molded article is obtained by using a pellet obtained by the method of producing a polycarbonate resin pellet of the present invention, its releasability is not reduced, the molded article hardly yellows, and the occurrence of a failure of the molded article, such as silver, can be prevented. Accordingly, the pellet can be used in various applications including: lighting covers; protective covers; casings for OA equipment, a copying machine, and a home

TABLE 2

| | | | | Example | |
|---|---|---|---|---|---|
| | | | | 10 | 11 |
| Composition of blend (part(s) by mass) | (A) Polycarbonate resin | FN1500 *10 | | 100 | 100 |
| | (B) Silicone compound | KR-511(a) *2 | | 0.1 | 0.1 |
| | | KR-511(b) *3 | | — | — |
| | | KR-511(c) *4 | | — | — |
| | | KR-511(d) *5 | | — | — |
| | | KR-511(e) *6 | | — | — |
| | (C) Glycerin ester | S-100A *7 | | 0.03 | 0.03 |
| | (D) Acrylic resin | BR-83 *8 | | 0.1 | 0.1 |
| | (E) Antioxidant | PEP-36A *9 | | 0.05 | 0.05 |
| Pellet molding condition | Addition amount of pure water (part(s) by mass) | | | 0.15 | 0.3 |
| | Temperature of molten resin at outlet of extruder (° C.) | | | 290 | 307 |
| Content of component (C) in pellet (part(s) by mass) | | | | 0.029 | 0.03 |
| Content of modified product of component (C) in pellet (part(s) by mass) | | | | Measurement lower limit | Measurement lower limit |
| Modification ratio of component (C) (%) | | | | Incalculable | Incalculable |
| YI value | | | Normal cycle | 1.17 | 1.20 |
| (YI retention test, 3-millimeter thick, flat plate) | | | Retention for 10 minutes | 1.38 | 1.37 |
| Releasability | | | | A | A |
| Presence or absence of occurrence of silver | | | | A | A |

*1 FN1500: bisphenol A polycarbonate resin (manufactured by Idemitsu Kosan Co., Ltd., viscosity-average molecular weight (Mv): 14,400, sodium content: less than 0.2 ppm by mass, water content: 370 ppm by mass)
In order for the water content of the polycarbonate resin to be adjusted, the water content was adjusted by performing water replacement through the storage of the resin at room temperature for 72 hours or more in a nitrogen chamber under a dry nitrogen atmosphere. The water content described above is obtained by: collecting the sample after the performance of purging with nitrogen and immediately before a kneading experiment; and measuring its water amount by a Karl-Fischer method.
*10 FN1500: bisphenol A polycarbonate resin (manufactured by Idemitsu Kosan Co., Ltd., viscosity-average molecular weight (Mv): 14,500, sodium content: less than 0.2 ppm by mass, water content: 260 ppm by mass)
The polycarbonate resin was produced under a nitrogen atmosphere, and the sample was collected immediately before a kneading experiment, followed by the measurement of its water amount by a Karl-Fischer method.
*2 KR-511(a): silicone compound having a methoxy group and a vinyl group as functional groups (manufactured by Shin-Etsu Chemical Co., Ltd., refractive index: 1.518, sodium content: 4 ppm by mass)
*3 KR-511(b): silicone compound having a methoxy group and a vinyl group as functional groups (manufactured by Shin-Etsu Chemical Co., Ltd., refractive index: 1.518, sodium content: 6 ppm by mass)
*4 KR-511(c): silicone compound having a methoxy group and a vinyl group as functional groups (manufactured by Shin-Etsu Chemical Co., Ltd., refractive index: 1.518, sodium content: 10 ppm by mass)
*5 KR-511(d): silicone compound having a methoxy group and a vinyl group as functional groups (manufactured by Shin-Etsu Chemical Co., Ltd., refractive index: 1.518, sodium content: 13 ppm by mass)
*6 KR-511(e): silicone compound having a methoxy group and a vinyl group as functional groups (manufactured by Shin-Etsu Chemical Co., Ltd., refractive index: 1.518, sodium content: 18 ppm by mass)
*7 S-100A: glycerin monostearate (manufactured by Riken Vitamin Co., Ltd., product name: RIKEMAL S-100A, sodium content: less than 2 ppm by mass)
*8 BR-83: acrylic resin (manufactured by Mitsubishi Rayon Co., Ltd., product name: Dianal BR83, Tg = 75° C., weight-average molecular weight: 40,000, sodium content: less than 1 ppm by mass)
*9 PEP-36A: phosphorus-based antioxidant, bis(2,6-di-tert-butylphenyl)pentaerythritol diphosphite [manufactured by ADEKA Corporation, product name: ADEKA STAB PEP-36A, sodium content: less than 1 ppm by mass]

electric appliance; optical molded articles, such as a lens and a light-guiding part; electrical and electronic parts; and window products. In particular, the pellet can be suitably used in: light-guiding plates for liquid crystal displays (light-guiding plates for liquid crystal panels) of a smartphone, a laptop personal computer, a television, and the like; and light-guiding parts for vehicles including a light-guiding part for an automobile intended for a daytime running light.

The invention claimed is:

1. A method of producing a polycarbonate resin pellet consisting of a polycarbonate resin serving as a component (A), a silicone compound serving as a component (B), an ester of an aliphatic carboxylic acid having 12 to 22 carbon atoms and glycerin serving as a component (C), an acrylic resin serving as an optional component (D), an antioxidant serving as an optional component (E), an alicyclic epoxy compound serving as an optional component (F), and an additive serving as an optional additive, the production method comprising a step including introducing a blend consisting of the component (A), the component (B) having a sodium content of 10 ppm by mass or less, the component (C), the optional component (D), the optional component (E), the optional component (F), and the optional additive into an extruder, and a water content in the blend is regulated by introducing 0.01 part by mass or more and 0.5 part by mass or less of water, and the water is supplied from a raw material-loading port of the extruder into the extruder, wherein the extruder has a vent, and melt-kneading the blend in the extruder under such a condition that a temperature of a molten resin at an outlet of the extruder is 260° C. or more and 325° C. or less, and a vacuum degree at an outlet of the vent is −700 mmHg or less, followed by extrusion molding to provide a polycarbonate resin pellet, wherein the silicone compound serving as a component (B) is a polymer or copolymer formed of a structural unit represented by following formula:

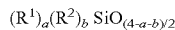

$(R^1)_a(R^2)_b\,SiO_{(4-a-b)/2}$ wherein: R1 represents at least one kind selected from the group consisting of a methoxy group and a vinyl group; R2 represents a methyl group, an ethyl group, or a phenyl group; and a and b each represent an integer satisfying 0<a≤3, 0≤b<3, and 0<a+b≤3, and wherein the optional additive is at least one or more selected from the group consisting of a UV absorber, a flame retardant, a flame retardant aid, a light stabilizer, a plasticizer, an antistatic agent, an antiblocking agent, an antimicrobial agent, a compatibilizer, and a lubricant, the resultant polycarbonate resin pellet containing 0.01 part by mass or more and 0.25 part by mass or less of the component (B), and 0.015 part by mass or more and 0.25 part by mass or less of the component (C) with respect to 100 parts by mass of the component (A).

2. The method of producing a polycarbonate resin pellet according to claim 1, wherein a sodium content in the component (A) to be used in the blend is 200 ppb by mass or less.

3. The method of producing a polycarbonate resin pellet according to claim 1, wherein a sodium content in the component (C) to be used in the blend is 2 ppm by mass or less.

4. The method of producing a polycarbonate resin pellet according to claim 1, wherein the component (C) comprises an ester of stearic acid and glycerin.

5. The method of producing a polycarbonate resin pellet according to claim 4, wherein the ester of stearic acid and glycerin comprises glycerin monostearate.

6. The method of producing a polycarbonate resin pellet according to claim 1, wherein the component (A) comprises an aromatic polycarbonate resin.

7. The method of producing a polycarbonate resin pellet according to claim 1, wherein the component (A) has a viscosity-average molecular weight of 9,000 or more and 30,000 or less.

8. The method of producing a polycarbonate resin pellet according to claim 1, wherein the component (A) has a viscosity-average molecular weight of 10,000 or more and 20,000 or less.

9. The method of producing a polycarbonate resin pellet according to claim 1, wherein a water content in the component (A) is 50 ppm by mass or more and 3,000 ppm by mass or less.

10. The method of producing a polycarbonate resin pellet according to claim 1, wherein an electrical conductivity of the water to be used in the regulation of the water content in the blend measured at 25° C. is 1 µS/m or less.

11. The method of producing a polycarbonate resin pellet according to claim 1, wherein the antioxidant as the component (E) is at least one selected from the group consisting of bis(2,6-di-tert-butylphenyl)pentaerythritol diphosphite and bis(2,4-dicumylphenyl)pentaerythritol diphosphite.

* * * * *